United States Patent [19]

Vogelgesang

[11] Patent Number: 4,525,696
[45] Date of Patent: Jun. 25, 1985

[54] DRIVER FOR ROTATING A MAGNETIC PLAYBACK HEAD

[75] Inventor: Peter J. Vogelgesang, Roseville, Minn.

[73] Assignee: Minnesota Mining & Manufacturing Company, St. Paul, Minn.

[21] Appl. No.: 473,996

[22] Filed: Mar. 10, 1983

Related U.S. Application Data

[62] Division of Ser. No. 211,265, Nov. 28, 1980, Pat. No. 4,433,351.

[51] Int. Cl.³ ............................................. H01F 7/08
[52] U.S. Cl. .................................. 335/272; 335/274; 335/279
[58] Field of Search ............. 335/229, 230, 253, 254, 335/272, 274, 276, 279, 281

[56] References Cited

U.S. PATENT DOCUMENTS

| | | | |
|---|---|---|---|
| 2,751,439 | 6/1956 | Burton | 360/76 |
| 2,937,239 | 5/1960 | Garber, Jr. et al. | 360/76 |
| 2,938,962 | 5/1960 | Konins et al. | 360/76 |
| 3,204,228 | 8/1965 | Eckert, Jr. | 360/26 |
| 3,234,436 | 2/1966 | Bieger | 335/274 X |
| 3,387,295 | 6/1968 | DeMoss | 360/71 |
| 3,526,726 | 9/1970 | Corbett et al. | 360/76 |
| 3,553,619 | 1/1971 | Skrobisch | 335/272 |
| 3,735,303 | 5/1973 | Harden | 335/272 |
| 3,934,216 | 1/1976 | Ward | 335/272 |
| 4,101,937 | 6/1978 | Jenkins | 360/76 |
| 4,258,398 | 5/1981 | Bixby | 360/76 |

FOREIGN PATENT DOCUMENTS

| | | |
|---|---|---|
| 1294522 | 3/1969 | Fed. Rep. of Germany ...... 335/272 |
| 925603 | 5/1963 | United Kingdom . |
| 980144 | 1/1965 | United Kingdom . |
| 2022874A | 12/1979 | United Kingdom . |

OTHER PUBLICATIONS

Patent Abstracts of Japan, vol. 2, No. 124, Oct. 18, 1978, p. 7291E78.

*Primary Examiner*—George Harris
*Attorney, Agent, or Firm*—Donald M. Sell; James A. Smith; William D. Bauer

[57] ABSTRACT

A driver for rotating a magnetic head affixed thereto having a housing, an armature rotably mounted within the housing, at least two field magnets within the housing and positioned around the axis of rotation for the armature, a driving coil and a concentrator for concentrating the magnetic flux from the field magnets so as to return the armature to a home position when no current is applied to the driving coil. The driver is affixed in the housing concentric with at least a portion of the armature such that a current passing through the driving coil develops a magnetic field polarizing the armature and causing a peripherential attraction of the armature toward an adjacent one of the field magnets and a corresponding repulsion of the armature from an adjacent other of the field magnets, thereby tending to rotate the armature a direction and distance proportional to the magnitude and polarity of the current.

3 Claims, 7 Drawing Figures

DRIVER FOR ROTATING A MAGNETIC PLAYBACK HEAD

This is a division of application Ser. No. 211,265 filed Nov. 28, 1980, now U.S. Pat. No. 4,433,351.

FIELD OF THE INVENTION

The present invention relates to a driver for rotating a magnetic head in order to maintain the correct phase relationship of analog recorded signals during the playback of multiple-tracks of a multitrack magnetic audio recording.

BACKGROUND OF THE INVENTION

It is a standard technique in magnetic recording to record multiple tracks of information onto a single magnetic medium. Such is the case, for example, with the left and right channels of a stereo recording. Although the information to be recorded in each of these channels is distinct, there is a common time relationship for the information contained in both of the channels which must be accurately maintained in order to ensure the information, in this case sound, is correctly interpreted or reproduced. This is often a problem since the transducer which is used to reproduce the information is ordinarily separate from the transducer which originally records the information onto the medium. Thus any variation in the alignment of the two transducers with respect to the medium will introduce a time difference, or phase error between the information as originally recorded and the information as reproduced. Even if the same transducer is used to reproduce the information as was used to record the information, misalignment can still occur due to a stretching of the medium or magnetic tape between the time of recording and reproducing, or a simple skewing of the tape with respect to the playback transducer during playback. This problem is especially manifest in the case of stereo broadcasting of the information contained on the medium, since a number of the listeners of stereo broadcasts utilize monophonic receivers. If phase errors occur between the left and right channels during the playback of a tape which is broadcast in stereo, it is possible that a listener utilizing a monophonic radio will hear a severely distorted signal. This is because the phase error between the left and right channels will cause an improper summation of these channels when they are mixed for monophonic reproduction. Tests conducted on current broadcast systems (i.e. those using cartridge type recorder/players) show that such systems find it difficult to consistently obtain a phase error of less than 45 degrees, and in fact, frequently produce a signal with a phase error as great as 360 degrees (as determined at the 12.5 kilohertz standard).

These values may sound extreme unless it is appreciated that the azimuth error between a head and the tracks on the medium need only be very minuscule for such a phase error to occur. For example, a 12 kHz tone requires 0.625 mil ($15.9 \times 10^{-4}$ cm) on a tape moving at 7.5 inches per second (19.1 cm/sec) to reproduce one cycle. If the various recorded tracks are longitudinally displaced by only 0.078 mil ($1.98 \times 10^{-4}$ cm) a resulting phase error of 45 degrees will be present in the reproduced signal. Assuming a 0.125 inch (0.3 cm) distance between the tracks, the azimuth error of the head which produces such a phase error is only 0°2′.

Several manufacturers have attempted to design record/playback systems which contain mechanisms to rectify this phase error problem. One such manufacturer utilizes a master record machine which contains a servoed record head which is adjusted during a pre-record calibration step to null or eliminate any phase error of that record head with respect to that medium. This method is however cumbersome since it requires recalibration prior to every recording operation. This method also does not totally solve the problem since the prerecorded master tape is then played back on any one of several playback machines. Calibration of the master recorder, although correcting the phase error for the tape as it is recorded in that machine, does not prevent phase error from being introduced when that same tape is played back on a different machine. It is therefore highly desirable to correct the phase error during playback of the tape rather than during the recording.

Another manufacturer (see U.K. Patent GB No. 2,022,874A) scans the upper and lower halves during the playback of a given information track and determines the time difference between the zero cross-overs of the monitored signals. This time difference is then used to derive a control signal for compensating this monitored phase error. This method also is not without problems because of the presence of signals having varying frequencies and amplitudes. These signals require substantial filtering and processing before they can be used to measure any phase error.

SUMMARY OF THE PRESENT INVENTION

The present invention is directed to a driver for rotating a magnetic playback head affixed thereto. The driver includes a housing, an armature rotatably mounted within the housing, at least two field magnets affixed at spaced intervals within the housing and positioned around the axis of rotation for the armature, a driving coil and a concentrator for concentrating the magnetic flux from the field magnets so as to return the armature to a home position when no current is applied to the coil. The driving coil is affixed in the housing concentric with at least a portion of the armature so that a current passing through the coil develops a magnetic field polarizing the armature and causing a peripherential attraction of the armature toward an adjacent one of the field magnets in a corresponding repulsion of the armature from and adjacent other of the field magnets, thereby tending to rotate the armature a direction and distance proportional to the magnitude and polarity of the current.

It is also one aspect of this invention that the oscillator signals can be recorded on separate tracks of the medium other than those dedicated for the program information and the location of these separate tracks on the medium can be configured to allow the use of a system employing the present invention with a medium that has been pre-recorded according to existing monophonic track location (e.g., N.A.B.) standards. This permits a broadcaster to utilize a system according to the present invention without requiring that it first replace all of its previously recorded materials.

BRIEF DESCRIPTION OF THE DRAWING

The present invention will be further described hereinafter with reference to the accompanying figures wherein like members refer to like parts in the separate views and wherein.

DETAILED DESCRIPTION OF THE PREFERRED EMBODIMENT

Figure 1:
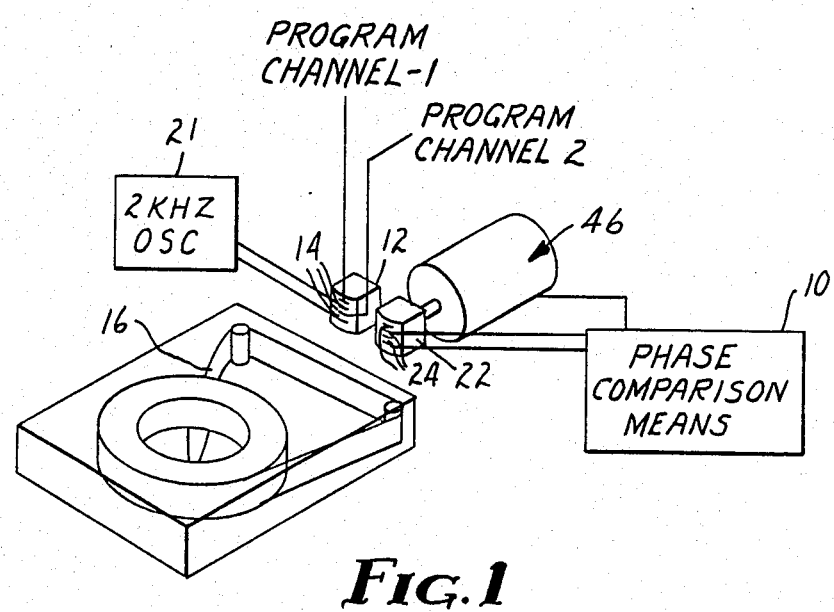
FIG. 1 is a pictorial illustration of a record/playback system utilizing the phase control means according to the present invention.

As best illustrated in FIG. 1 the present invention comprises the inclusion within an audio record/playback system of record transducer means including a record head 12 having a plurality of gaps 14 disposed in a transversely spaced relationship with respect to a magnetic medium 16 such as magnetic recording tape. These gaps 14 are part of a magnetic circuit (not shown) which affords the recording of information into a plurality of parallel tracks running along the medium 16. Oscillator means 21 are electronically connected to the record transducer to supply an electrical signal oscillating at a predetermined frequency to the record head 12 and thereby generate a magnetic field across at least two of the gaps 14 on the record head 12. This signal is applied in a known phase relationship to the record head 12 in order to record the oscillator signal onto two tracks of the magnetic medium 16 with a known phase relationship therebetween. In the preferred embodiment, this phase relationship is optimally zero phase difference between the resulting recorded signals. As can be seen from FIG. 1, the remaining gaps which are not connected to the oscillator means 21 are connected to sources for the two channels of stereo program information.

Figures 4A, 4B:
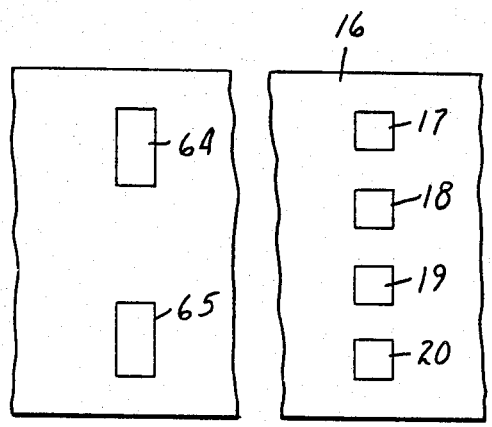
FIGS. 4A and 4B are pictorial illustrations of the two track configurations currently used as NAB standards and the track configuration as proposed by the present invention.

Practically applied within a stereo recording system, the elements thus far described preferably result in a magnetic medium 16 having four tracks of information recorded thereon, with, as illustrated in FIG. 4B, the uppermost track 17 devoted to the left channel of the program information, the track 18 immediately therebeneath devoted to the oscillator signal, the track 19 immediately below the first signal track devoted to the right program channel of the stereo recording, and the final track 20 immediately below the right channel program track and above the lower end of the tape devoted to the second phase signal from the oscillator. This last signal or phase tone track 20 may also contain cuing information which is utilized to control the starting or stopping of the playback of the information recorded on the medium. The cuing information is recorded along with the oscillator signal by standard switching techniques. This track configuration is compatible with the standardized NAB configuration for two-track monophonic systems. As can be seen in FIG. 4B, the proposed left program track 17 overlaps the program track 64 (see FIG. 4A) of the monophonic NAB standard, and the signal track 20 overlaps the cuing track 65 of this monophonic standard. Hence, the proposed track configuration will allow the use of an apparatus employing the present invention with recordings which have been made on other systems according to the NAB monophonic track location standards. These earlier recordings, however, will not require the apparatus to utilize the phase control means described herein since monophonic recording and reproduction does not encounter a phase problem.

Having recorded a control signal onto at least two tracks 18 and 20 of the magnetic medium 16, with the resulting signals on these two tracks 18 and 20 having a known phase relationship with each other, it is possible to use the remaining elements of the present invention to achieve and maintain the correct phase relationship of the remaining tracks of information recorded onto the medium 16 and which is now to be played back. For this purpose, the present invention includes playback transducer means including a playback head 22 having a plurality of gaps 24 disposed in a transversely spaced relationship with respect to the medium 16 and adjacent the medium 16 affording the playback of the information recorded thereon. Two of the gaps 24 have a location with respect to the medium 16 affording the detection of the recorded signal tracks 18 and 20 previously described. The signals recorded onto these tracks 18 and 20 magnetically influence the playback transducer means associated with the appropriate gaps 24 and cause corresponding electrical signals to be inputed into the phase comparison means. The phase comparison means then compares and determines the phase relationship of the signals as they are played back by the playback transducer means, (which signals were originally recorded on the medium 16 by the record head 12).

Figure 2:
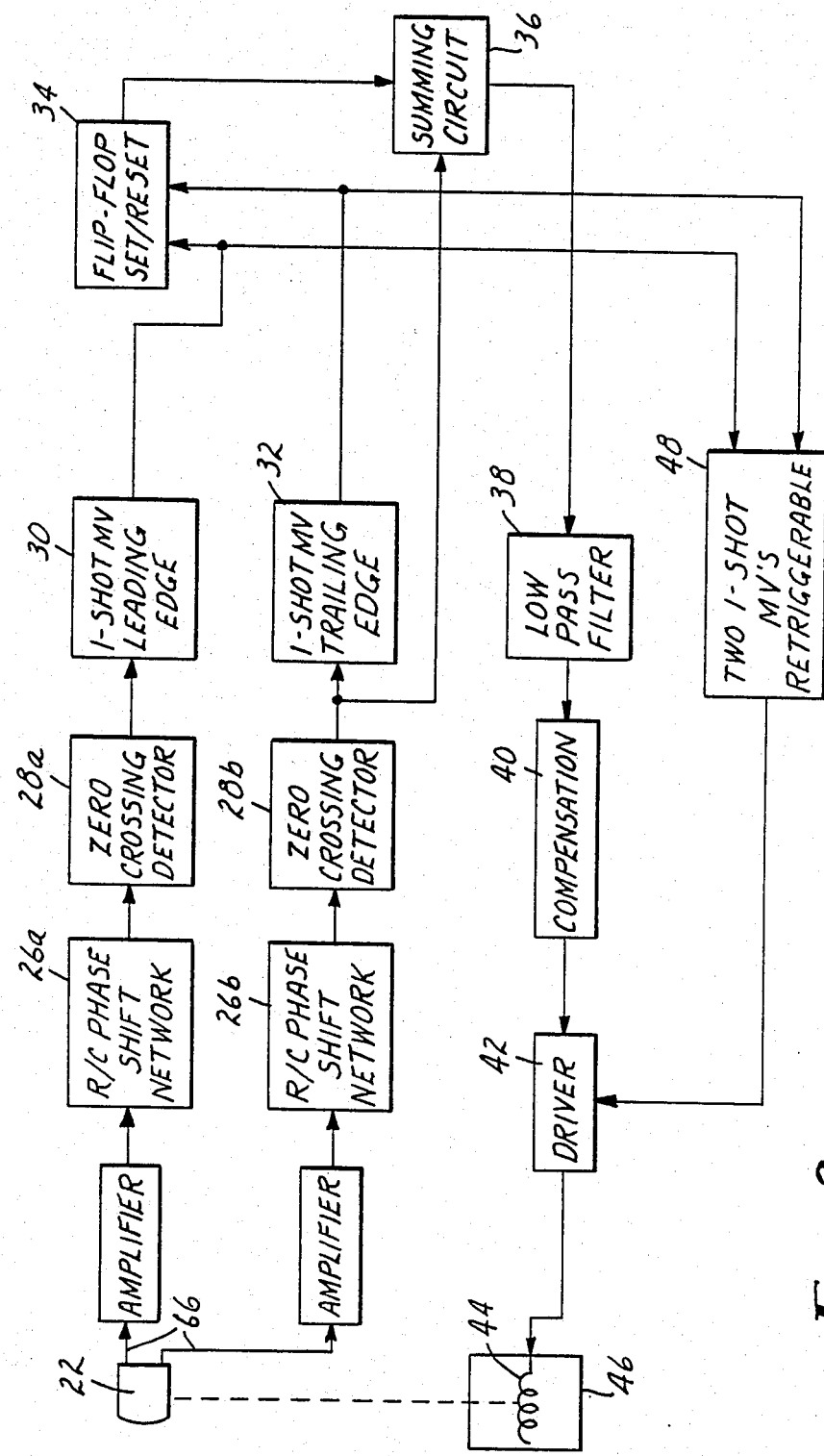
FIG. 2 is a schematic block diagram of a phase comparator circuit as illustrated in FIG. 1.

FIG. 2 shows a typical electrical circuit utilized by the preferred embodiment for the phase comparison means. Each of the control signals played back by the playback head 22 is amplified and individually applied to one of the RC phase shift networks 26a or 26b. The phase shift network 26a or 26b delays the inputed signal for an interval of time which is predetermined upon the initial use of a given playback head 22, and which corresponds to a displacement of the individual gaps on the playback head 22 from an imaginary line or axis drawn through their center if they were in exact alignment. Such displacement is known as gap scatter. The RC phase shift networks 26a and 26b displace or phase shift the monitored signal by a time interval equal to, but opposite to, the time interval difference between the monitored signals caused by the gap scatter and recorded onto the program tracks. In effect, this negates the gap scatter. The delay networks 26a and 26b are calibrated each time a playback head 22 is replaced in the machine.

The delayed signals from the networks 26a and 26b are applied to zero crossing detectors 28a and 28b. These zero crossing detectors 28 develop a rectangular wave form wherein the rise and fall of the wave form corresponds to the crossover point or zero voltage point of the inputed signals. The output of the detector 28a triggers a one-shot multivibrator 30 at the leading edge of a signal, and the output of the detector 28b triggers a second one-shot multivibrator 32, at the trailing edge of a signal. Each of the one-shot multivibrators 30 and 32 generate sub-microsecond pulses which set and reset a flip-flop 34. This flip-flop 34 in responding to the first and second triggering circuits 30 and 32 outputs a second rectangular wave form having a duty cycle which is proportional to the phase difference between the two inputed rectangular wave forms. Thus, if the time intervals between the adjacent pulses of the inputed wave forms are equal, the output of the flip-flop is a rectangular wave form with a 50—50 duty cycle. Whatever its duty cycle, the output of the flip-flop 34 is summed with the output of the zero crossing detectors 28b by a summing circuit 36. The output of the summing circuit 36 will be zero whenever the compensated phase error as monitored by the playback head 22 is zero (i.e. the crossovers have occurred at the same time). Any phase error, however, between the inputed signals will cause the output of the summing circuit 36 to go positive for one direction of phase error and to go negative for the opposite direction of phase error. The width of the resulting positive or negative pulses will increase as the phase error increases.

The pulses of the summing circuit 36 are filtered through a low pass filter 38 which passes an error signal proportional to both the steady-state and transient phase error and which filters out the component of the original signal frequency from the oscillator 20. This error signal is fed to a servo compensation circuit 40 containing several active filters to compensate for the electrical and inertial properties of the head rotating mechanism (to be described) and which permit a closed loop operation of the present invention without the system becoming unstable or oscillating. Finally, the compensated error signal is fed to a servo driver 42 which amplifies the error signal and supplies a relatively high current into a coil 44 of the electrically responsive driver means 46.

In order to further stabilize the operation of the present invention another pair of one-shot multivibrators 48 are used to enable the driver means 46. Both of these one-shot multivibrators 48 must be triggered in order for the driver means 46 to operate. Without both of the one-shot multivibrators 48 being triggered, the driver is effectively disconnected from the circuit. It will be seen upon reference to the description of the driver means 46 that under this condition, the driver means 46 is allowed to electrically float, effectively affording the restoration of the head 22 to a neutral position. Since the one-shot multivibrators 48 are triggered directly by the output of the first and second triggering cirucits 30 and 32 this floating condition will occur with the loss of either of the phase track signals. Hence the multivibrators 48 can be used to de-activate the driver means 46 when the signals drop out or when the signals are not present as is the case with monophonic recordings.

Figure 3A:
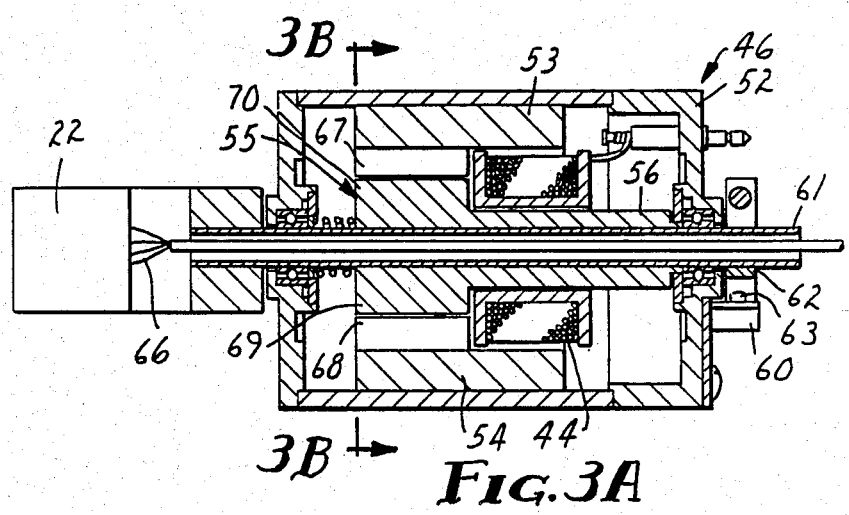
FIGS. 3A, 3B, and 3C are sectional views of a driver means according to the present invention.
Figure 3B:
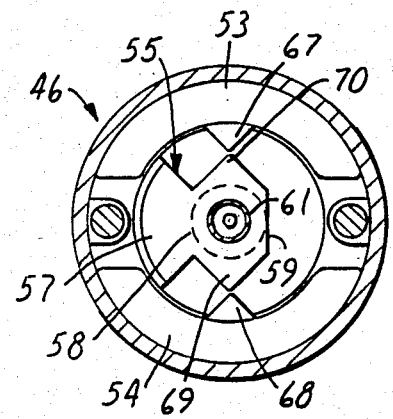
Figure 3C:
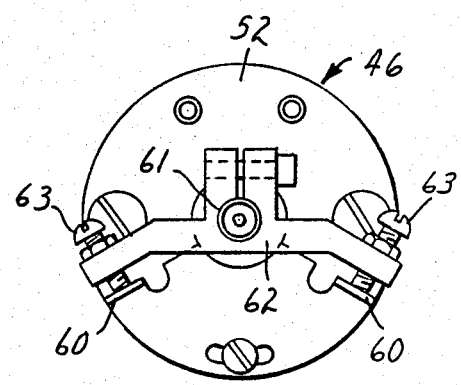

The driver means 46 is best illustrated in FIG. 3, and includes a DC motor comprising a housing 52, a pair of elongate field magnets 53 and 54 each being affixed at radially opposing positions within the housing 52 and having a peaked portion 67 or 68 projecting inwardly from the housing 52, and an armature 55 rotatably mounted within the housing 52. The armature 55 has a generally cylindrical first portion 56 and a second portion including a semi-cylindrical side 57 and an angulated side 58. The angulated side 58 includes two radially opposing peak shaped projections 69 and 70 symmetrically disposed about the axis of rotation of the armature 55, and a planar surface 59 connecting these projections. The field magnets 53 and 54 will tend to rotate the armature 55 to a position where the magnetic flux is the most concentrated. This occurs when the projections 69 and 70 are proximate the projections 67 and 68 of the field magnets 53 and 54. It is to this position that the armature 55 tends to return when there are no competing magnetic forces tending to move it elsewhere. The DC motor 50 also includes a cylindrical driving coil 44 affixed in the housing 52 concentric with the cylindrical first portion 56 of the armature 55. As previously described, this coil 44 is electrically connected to the phase comparison means, with any current from the output of the phase comparison means passing through the coil 44 and causing a second magnetic field to develop which magnetizes the semi-cylindrical side 57. This results in a preferential attraction of the semi-cylindrical side 57 to one or the other of the field magnets 53 or 54 and a corresponding repulsion to the other field magnet 53 or 54, thereby tending to rotate the armature 55 within the housing 52. The particular direction of rotation is dependent upon the direction of current from the servo driver 42, which in turn is determined by the direction of the phase difference.

The rotation of the armature 55 rotates the playback head 22 about an axis perpendicular to the medium 16, a distance and direction determined by the output current of the servo driver 42. This rotation changes the angle of the playback head gaps with respect to tracks on the recorded medium 16. In effect this changes the relative position that the various gaps have with respect to their corresponding tracks on the medium 16 and will therefore dynamically compensate for, or null any phase difference between the played back or monitored oscillator signals as determined by the phase comparison means. Since the remainder of the tracks, i.e. those containing program information, contain a similar time relationship as the oscillator signals, the present invention will also compensate for phase error occurring within the program tracks and thereby maintain the correct phase relationship for the information recorded on these program tracks. Since the correction of phase error seldom requires more than a few minutes of rotation, the present invention contains mechanical means to limit any excess rotation of the DC motor 50. In the preferred embodiment, this is accomplished by a pair of stops 60 rigidly connected to the housing 52, an arm 62 connected to a shaft 61, and adjustment screws 63 passing through the arm 62 and positioned to contact the stops 60 during the rotation of the shaft 61. These screws 63 can be adjusted to vary the maximum rotation of the shaft 61.

For convenience in connecting the playback head 22 to the phase comparison means, the center of the armature 55 is drilled and a hollow brass shaft 61 is inserted in the resulting bore. This shaft 61 allows wires 66 from the playback head to pass through the center of the DC motor 50, which minimizes the extraneous forces that the head wires 62 might otherwise exert against the rotation of the armature 55. This shaft 61 also provides a convenient means of bringing the head wires 62 from the head 22 to the amplifiers. The cylindrical coil 44 is wound on a plastic bobbin which is cemented to one end of the field magnets 53 and 54. This permits the armature 55 to rotate within the coil 44 without disturbing magnetic induction and the soldering of the leads from the coil directly to the fixed terminals without concern for flexibility or commutation.

Having thus described a preferred embodiment of the present invention, it will be understood that changes may be made in size, shape, or configuration of some of the parts without departing from the present invention as described in the appended claims.

What is claimed is:

1. A driver for rotating a magnetic playback head affixed thereto comprising
 (a) a housing,
 (b) an armature rotatably mounted within said housing, (c) at least two field magnets affixed at spaced intervals within said housing and positioned around the axis of rotation for said armature, (d) a driving coil affixed in said housing concentric with at least a portion of said armature whereby a current passing through said coil develops a continuously variable magnetic field polarizing said armature and causing a continuously variable preferential attraction of said armature toward an adjacent one of said field magnets and a corresponding continuously variable repulsion of said armature from an adjacent other of said field magnets, thereby tending to rotate said armature a direction and distance continuously proportional to the magnitude and polarity of said current, and (e) means for concentrating the magnetic flux from said field magnets so as to return said armature to a home position when no current is applied to said coil.

2. A driver as claimed in claim 1 wherein said means for concentrating the magnetic flux comprises a pair of peaked projections on said field magnets each disposed at radially opposing positions within said housing and projecting inwardly from said housing, and a pair of peaked projections on said armature also disposed at radially opposing positions symmetric about the axis of rotation for said armature.

3. A driver as claimed in claim 1 wherein said armature includes a central bore and a hollow shaft inserted in said bore.

* * * * *